United States Patent
Dolgov et al.

(10) Patent No.: US 8,874,305 B2
(45) Date of Patent: Oct. 28, 2014

(54) DIAGNOSIS AND REPAIR FOR AUTONOMOUS VEHICLES

(75) Inventors: Dmitri A. Dolgov, Mountain View, CA (US); Christopher Paul Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,674

(22) Filed: Sep. 29, 2011

(65) Prior Publication Data

US 2012/0083959 A1 Apr. 5, 2012

Related U.S. Application Data

(60) Provisional application No. 61/390,094, filed on Oct. 5, 2010, provisional application No. 61/391,271, filed on Oct. 8, 2010.

(51) Int. Cl.
*B60T 7/12* (2006.01)
*G05D 1/02* (2006.01)
*B60W 30/186* (2012.01)

(52) U.S. Cl.
CPC ............ *G05D 1/021* (2013.01); *G05D 1/0278* (2013.01); *G05D 1/0274* (2013.01); *G05D 1/0246* (2013.01); *B60W 2550/22* (2013.01); *G05D 1/0214* (2013.01); *B60W 30/186* (2013.01); *G05D 2201/0213* (2013.01); *G05D 1/0257* (2013.01); *G05D 1/024* (2013.01); *B60W 2530/14* (2013.01)
USPC ............ 701/31.9; 701/25; 701/28; 701/29.1; 701/31.6; 701/32.3; 701/70

(58) Field of Classification Search
USPC .............. 701/23, 25, 26, 28, 29.1, 31.6, 31.9, 701/32.3, 32.5, 44, 70, 71, 77, 78
See application file for complete search history.

(56) References Cited

U.S. PATENT DOCUMENTS

| | | | |
|---|---|---|---|
| 1,924,984 A | 8/1933 | Fageol | |
| 3,186,508 A | 6/1965 | Lamont | |
| 3,324,805 A | 6/1967 | Mulch | |
| 3,596,728 A | 8/1971 | Neville | |

(Continued)

FOREIGN PATENT DOCUMENTS

| | | |
|---|---|---|
| EP | 2216225 A1 | 8/2010 |
| JP | 09-160643 A | 6/1997 |

(Continued)

OTHER PUBLICATIONS

International Search Report and the Written Opinion for Application No. PCT/US 2011/054896, Apr. 25, 2012.

(Continued)

*Primary Examiner* — Thomas G Black
*Assistant Examiner* — Peter D Nolan
(74) *Attorney, Agent, or Firm* — Lerner, David, Littenberg, Krumholz & Mentlik, LLP (57) ABSTRACT

A system and method of controlling a vehicle is provided. In one aspect, the system and method determines the amount of wear on a component of the vehicle and, based on the amount of wear and information derived from the environment surrounding the vehicle (e.g., another vehicle in the path of the vehicle or a requirement to stop at a particular location), maneuvers the vehicle to mitigate further wear on the component.

17 Claims, 6 Drawing Sheets

(56) References Cited

U.S. PATENT DOCUMENTS

| | | | |
|---|---|---|---|
| 4,372,414 A | 2/1983 | Anderson et al. | |
| 4,387,783 A | 6/1983 | Carman | |
| 4,656,834 A | 4/1987 | Elpern | |
| 4,924,795 A | 5/1990 | Ottemann | |
| 4,982,072 A | 1/1991 | Takigami | |
| 5,187,666 A * | 2/1993 | Watanabe | 701/79 |
| 5,415,468 A | 5/1995 | Latarnik et al. | |
| 5,448,487 A | 9/1995 | Arai | |
| 5,470,134 A * | 11/1995 | Toepfer et al. | 303/9.61 |
| 5,684,696 A * | 11/1997 | Rao et al. | 701/25 |
| 5,774,069 A | 6/1998 | Tanaka et al. | |
| 5,906,645 A | 5/1999 | Kagawa et al. | |
| 6,064,926 A | 5/2000 | Sarangapani et al. | |
| 6,070,682 A * | 6/2000 | Isogai et al. | 180/167 |
| 6,151,539 A * | 11/2000 | Bergholz et al. | 701/25 |
| 6,195,610 B1 | 2/2001 | Kaneko | |
| 6,321,147 B1 * | 11/2001 | Takeda et al. | 701/23 |
| 6,332,354 B1 * | 12/2001 | Lalor et al. | 73/121 |
| 6,343,247 B2 | 1/2002 | Jitsukata et al. | |
| 6,438,472 B1 | 8/2002 | Tano et al. | |
| 6,438,491 B1 | 8/2002 | Farmer | |
| 6,470,874 B1 | 10/2002 | Mertes | |
| 6,504,259 B1 | 1/2003 | Kuroda et al. | |
| 6,516,262 B2 * | 2/2003 | Takenaga et al. | 701/96 |
| 6,591,172 B2 | 7/2003 | Oda et al. | |
| 6,643,576 B1 | 11/2003 | O Connor et al. | |
| 6,832,156 B2 | 12/2004 | Farmer | |
| 6,836,719 B2 | 12/2004 | Andersson et al. | |
| 6,847,869 B2 * | 1/2005 | Dewberry et al. | 701/33.9 |
| 6,862,524 B1 | 3/2005 | Nagda et al. | |
| 6,876,908 B2 * | 4/2005 | Cramer et al. | 701/29.3 |
| 6,934,613 B2 | 8/2005 | Yun | |
| 7,011,186 B2 * | 3/2006 | Frentz et al. | 188/1.11 L |
| 7,031,829 B2 | 4/2006 | Nisiyama | |
| 7,102,496 B1 | 9/2006 | Ernst, Jr. et al. | |
| 7,194,347 B2 | 3/2007 | Harumoto et al. | |
| 7,207,304 B2 | 4/2007 | Iwatsuki et al. | |
| 7,233,861 B2 | 6/2007 | Van Buer et al. | |
| 7,327,242 B2 | 2/2008 | Holloway et al. | |
| 7,346,439 B2 | 3/2008 | Bodin | |
| 7,394,046 B2 | 7/2008 | Olsson et al. | |
| 7,486,802 B2 | 2/2009 | Hougen | |
| 7,499,774 B2 | 3/2009 | Barrett et al. | |
| 7,499,776 B2 | 3/2009 | Allard et al. | |
| 7,499,804 B2 | 3/2009 | Svendsen et al. | |
| 7,515,101 B1 | 4/2009 | Bhogal et al. | |
| 7,579,942 B2 | 8/2009 | Kalik | |
| 7,656,280 B2 | 2/2010 | Hines et al. | |
| 7,694,555 B2 * | 4/2010 | Howell et al. | 73/129 |
| 7,818,124 B2 | 10/2010 | Herbst et al. | |
| 7,865,277 B1 | 1/2011 | Larson et al. | |
| 7,894,951 B2 | 2/2011 | Norris et al. | |
| 7,908,040 B2 | 3/2011 | Howard et al. | |
| 7,956,730 B2 | 6/2011 | White et al. | |
| 8,050,863 B2 | 11/2011 | Trepagnier et al. | |
| 8,078,349 B1 | 12/2011 | Prada Gomez et al. | |
| 8,190,322 B2 * | 5/2012 | Lin et al. | 701/31.5 |
| 8,195,341 B2 | 6/2012 | Huang et al. | |
| 8,244,408 B2 | 8/2012 | Lee et al. | |
| 8,260,515 B2 | 9/2012 | Huang et al. | |
| 8,280,601 B2 | 10/2012 | Huang et al. | |
| 8,634,980 B1 | 1/2014 | Urmson et al. | |
| 2001/0037927 A1 | 11/2001 | Nagler et al. | |
| 2003/0016804 A1 | 1/2003 | Sheha et al. | |
| 2003/0055554 A1 | 3/2003 | Shioda et al. | |
| 2003/0093209 A1 | 5/2003 | Andersson et al. | |
| 2004/0243292 A1 | 12/2004 | Roy | |
| 2005/0012589 A1 | 1/2005 | Kokubu et al. | |
| 2005/0273251 A1 | 12/2005 | Nix et al. | |
| 2006/0037573 A1 | 2/2006 | Iwatsuki et al. | |
| 2006/0082437 A1 | 4/2006 | Yuhara | |
| 2006/0089764 A1 | 4/2006 | Filippov et al. | |
| 2006/0178240 A1 | 8/2006 | Hansel | |
| 2006/0276942 A1 | 12/2006 | Anderson et al. | |
| 2007/0165910 A1 | 7/2007 | Nagaoka et al. | |
| 2007/0225909 A1 | 9/2007 | Sakano | |
| 2007/0239331 A1 | 10/2007 | Kaplan | |
| 2007/0247281 A1 | 10/2007 | Shimomura | |
| 2008/0021628 A1 | 1/2008 | Tryon | |
| 2008/0059048 A1 | 3/2008 | Kessler et al. | |
| 2008/0084283 A1 | 4/2008 | Kalik | |
| 2008/0120025 A1 | 5/2008 | Naitou et al. | |
| 2008/0147253 A1 | 6/2008 | Breed | |
| 2008/0161987 A1 | 7/2008 | Breed | |
| 2008/0183512 A1 | 7/2008 | Benzinger et al. | |
| 2008/0188246 A1 | 8/2008 | Sheha et al. | |
| 2008/0277183 A1 | 11/2008 | Huang et al. | |
| 2008/0303696 A1 | 12/2008 | Aso et al. | |
| 2008/0306969 A1 | 12/2008 | Mehta et al. | |
| 2009/0005959 A1 | 1/2009 | Bargman et al. | |
| 2009/0082879 A1 | 3/2009 | Dooley et al. | |
| 2009/0115594 A1 | 5/2009 | Han | |
| 2009/0248231 A1 | 10/2009 | Kamiya | |
| 2009/0276154 A1 | 11/2009 | Subramanian et al. | |
| 2009/0287367 A1 | 11/2009 | Salinger | |
| 2009/0287368 A1 * | 11/2009 | Bonne | 701/29 |
| 2009/0319096 A1 | 12/2009 | Offer et al. | |
| 2009/0319112 A1 | 12/2009 | Fregene et al. | |
| 2009/0326799 A1 | 12/2009 | Crook | |
| 2010/0017056 A1 | 1/2010 | Asakura et al. | |
| 2010/0052945 A1 | 3/2010 | Breed | |
| 2010/0076640 A1 | 3/2010 | Maekawa et al. | |
| 2010/0179720 A1 | 7/2010 | Lin et al. | |
| 2010/0205132 A1 | 8/2010 | Taguchi | |
| 2010/0228419 A1 | 9/2010 | Lee et al. | |
| 2010/0241297 A1 | 9/2010 | Aoki et al. | |
| 2010/0253542 A1 | 10/2010 | Seder et al. | |
| 2010/0256836 A1 | 10/2010 | Mudalige | |
| 2011/0071718 A1 | 3/2011 | Norris et al. | |
| 2011/0137520 A1 | 6/2011 | Rector et al. | |
| 2011/0150348 A1 | 6/2011 | Anderson | |
| 2011/0206273 A1 | 8/2011 | Plagemann et al. | |
| 2011/0213511 A1 | 9/2011 | Visconti et al. | |
| 2011/0254655 A1 | 10/2011 | Maalouf et al. | |
| 2012/0053775 A1 | 3/2012 | Nettleton et al. | |
| 2012/0157052 A1 | 6/2012 | Quade | |
| 2012/0277947 A1 | 11/2012 | Boehringer et al. | |

FOREIGN PATENT DOCUMENTS

| | | | |
|---|---|---|---|
| JP | 11282530 A | 10/1999 | |
| JP | 2000149188 A | 5/2000 | |
| JP | 2000305625 A | 11/2000 | |
| JP | 2000-338008 A | 12/2000 | |
| JP | 2001-101599 A | 4/2001 | |
| JP | 2002236993 A | 8/2002 | |
| JP | 2002251690 A | 9/2002 | |
| JP | 2003081039 A | 3/2003 | |
| JP | 2003162799 A | 6/2003 | |
| JP | 2005067483 A | 3/2005 | |
| JP | 2005071114 A | 3/2005 | |
| JP | 2005-339181 A | 12/2005 | |
| JP | 2006322752 A | 11/2006 | |
| JP | 2007001475 A | 1/2007 | |
| JP | 2008117082 A | 5/2008 | |
| JP | 2008152655 A | 7/2008 | |
| JP | 2008170404 A | 7/2008 | |
| JP | 2008290680 A | 12/2008 | |
| JP | 2009053925 A | 3/2009 | |
| WO | 0070941 A1 | 11/2000 | |
| WO | 0188827 | 11/2001 | |
| WO | 2009028558 A1 | 3/2009 | |
| WO | 2011021046 A1 | 2/2011 | |

OTHER PUBLICATIONS

PCT Notification of Transmittal of the International Search Report and the Written Opinion of the International Searching Authority for PCT/US2011/054899, Oct. 5, 2011.

(56) References Cited

OTHER PUBLICATIONS

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

"Google Cars Drive Themselves, in Traffic" [online]. [Retrieved Aug. 19, 2011] Retrieved from the internet: <http://www.nytimes.com/2010/10/10/science/10google.html>, 4 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for the 2007 DARPA Urban Challenge, Dec. 2007, 27 pages.

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

Vincenzo DiLecce and Marco Calabrese, Experimental System to Support Real-Time Driving Pattern Recognition, 2008, pp. 1192-1199.

International Search Report and the Written Opinion for Application No. PCT/US 2011/054154, Apr. 24, 2012.

\* cited by examiner

FIGURE 8

DIAGNOSIS AND REPAIR FOR AUTONOMOUS VEHICLES

CROSS REFERENCE TO RELATED APPLICATIONS

The present application claims the benefit of the filing dates of U.S. Provisional Application No. 61/390,094, entitled "AUTONOMOUS VEHICLES," filed Oct. 5, 2010, and U.S. Provisional Application No. 61/391,271, entitled "AUTONOMOUS VEHICLES," filed Oct. 8, 2010, the entire disclosures of which are hereby incorporated herein by reference.

BACKGROUND

Autonomous vehicles may be configured to be driven in a manual mode (where the operator exercises a high degree of control over the movement of the vehicle) or in an autonomous mode (where the vehicle essentially drives itself). These vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode to an autonomous mode and to modes that lie somewhere in between.

A vehicle with autonomous driving capability may be configured to receive signal inputs from the sensors that monitor the vehicle operations, surrounding objects and road conditions in order to identify safety hazards and generate countermeasures to deal with various driving situations. The autonomous vehicle may also collect and record data from various information sources such as cellular network, satellites as well as user inputs such as users' identification, destinations and routes of navigation requests and vehicle operation preferences.

A vehicle with autonomous driving capability may further be adapted to detect various potential hazardous conditions and issue warnings to the user. The potential hazardous condition may include, for example, the vehicle's approaching a sharp curve, nearby pedestrians, icy roads, etc. Such vehicle may also be configured with mechanisms of taking active steps to avoid these hazards, e.g., slowing down the vehicle, applying the brake, etc.

SUMMARY

In one aspect, a method of maneuvering a vehicle is provided. The method includes detecting a characteristic of the environment surrounding the vehicle and detecting the amount of damage to a component of the vehicle, wherein different maneuvers can be expected to affect the component, and thus the damage, differently. A processor selects between a first maneuver and a second maneuver based on the detected environment characteristic and detected damage amount. The vehicle is then moved in accordance with the selected maneuver.

In another aspect, a system includes a processor and sensors. One sensor is in communication with the processor and is configured to detect the presence of physical damage to a component of a vehicle. Another sensor is in communication with the processor and configured to detect the presence of objects external to the vehicle that require a change in the motion of the vehicle, e.g., maneuvering around the object or stopping proximate to the object. A memory contains instructions accessible by the processor. The instructions include changing the motion of the vehicle relative to the external object based on output received from the two sensors.

In still another aspect, a method of controlling a vehicle includes: determining the wear on a component of the vehicle; determining the geographic position of the vehicle; determining traffic requirements in the path of the vehicle; and selecting, with a processor, between a first and second maneuver based on the determined wear and the determined distance. At least one difference between the first and second maneuver is selected from the group consisting of rate of acceleration, rate of deceleration and direction. The vehicle is moved in accordance with the selected maneuver.

In a further aspect, a vehicle is provided that includes control components for controlling the movement of the vehicle. The components respond to commands from a passenger and a processor. Environment sensors detect the environment external to the vehicle and component sensors detect the physical characteristic of components internal to the vehicle, where such physical characteristic changes based on the operation of the vehicle. A processor is in communication with the control components, environment sensors and component sensors, and executes instructions that include: receiving output from the environment sensors, receiving output from the component sensors, selecting a first command or second command to be provided to the control components based on the output from the environment sensors and component sensors, and providing the selected command to the control components.

In another aspect, a system of controlling the movement of a vehicle includes a processor, a memory accessible by the processor, and instructions contained in the memory and executable by the processor. The instructions include: determining the geographic location of the vehicle relative to location-dependant vehicle movement restrictions, determining whether a first component of the vehicle is damaged, providing a first instruction to a second component of the vehicle to move the vehicle so as to comply with the location-dependant movement restriction when the first component is determined to be not damaged, and providing a second instruction to the second component to move the vehicle so as to comply with the location-dependant movement restriction when the first when the first component is determined to be damaged. The movement instructed by the second instruction is different than the movement instructed by the first command.

DETAILED DESCRIPTION

Short Summary

In one aspect, a system and method of autonomously moving a vehicle is provided wherein sensors detect whether a component is damaged and a processor maneuvers the vehicle differently based on the presence of damage and in order to mitigate further damage to the component.

Vehicle Introduction

Figure 1:
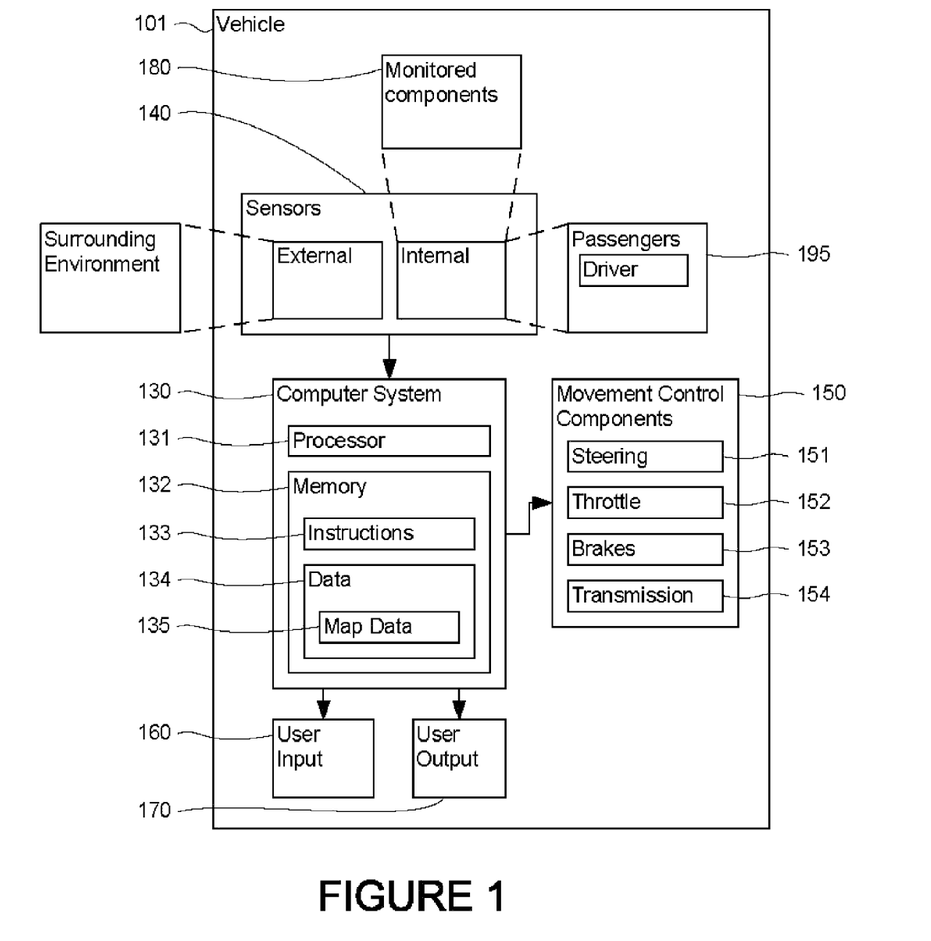
FIG. 1 is a functional diagram of a system.

FIG. 1 illustrates one possible aspect of an autonomous driving system of vehicle 101. Although certain aspects of the invention are particularly useful in connection with specific types of vehicles, vehicle 101 may be any type of vehicle. Possible vehicles include, by way of example only, cars, trucks, motorcycles, busses, boats, airplanes, helicopters, lawnmowers, recreational vehicles, amusement park vehicles, trams, golf carts, trains and trolleys.

Vehicle 101 may include an autonomous vehicle computer system 130 that is in communication with sensors 140, components 150 that control the movement of the vehicle, user input 160 and user indicators 170.

Computer System

Computer system 130 may comprise a computer containing a processor 131, memory 132 and other components typically present in general purpose computers.

The memory 132 stores information accessible by processor 131, including instructions 133 and data 134 that may be executed or otherwise used by the processor 131. The memory 132 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 133 may be any set of instructions to be executed directly (such as machine code) or indirectly (such as scripts) by the processor. For example, the instructions may be stored as computer code on a computer-readable medium. In that regard, the terms "instructions" and "programs" may be used interchangeably herein. The instructions may be stored in object code format for direct processing by the processor, or in any other computer language including scripts or collections of independent source code modules that are interpreted on demand. Functions, methods and routines of the instructions are explained in more detail below.

The data 134 may be retrieved, stored or modified by processor 131 in accordance with the instructions 133. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 131 may be any conventional processor, such as processors from Intel Corporation or Advanced Micro Devices. Alternatively, the processor may be a dedicated device such as an ASIC. Although FIG. 1 functionally illustrates the processor, memory, and other elements of central control 130 as being within the same block, it will be understood by those of ordinary skill in the art that the processor and memory may actually comprise multiple processors and memories that may or may not be stored within the same physical housing. For example, rather than being stored in the same computer, processor 131 and memory 132 may be stored in separate devices. Although there may be advantages to locating the processor 131 and memory 132 within vehicle 101, various processes may be performed external to the vehicle and various data may be stored outside of the vehicle. For example, if a processor or memory used or required by the vehicle 101 occurs in an external device, vehicle 101 may obtain the information it requires wirelessly. Accordingly, although references to a processor or memory herein will assume that the processor and memory are affixed to vehicle 101, such references will be understood to include references to a collection of processors or computers or memories that may or may not operate in parallel and may or may not be located within affixed to vehicle 101.

Map Data

Data 134 may include map-related data 135. In addition to storing the geographic location of streets and their intersections, the map data may further include information relating to traffic rules and location-specific rules, such as the geographic location of stop signs and speed limits. Yet further, the map data may include information relating to altitude, e.g., information from which the grade of a hill may be determined.

Navigation Controls

As shown in FIG. 1, a vehicle 101 may include various components 150 relating to controlling the navigation of the vehicle. For example, the vehicle may include steering 151, throttle 152 (e.g., operated by an accelerator), brakes 153 and transmission 154.

Monitored Components

Figure 2:
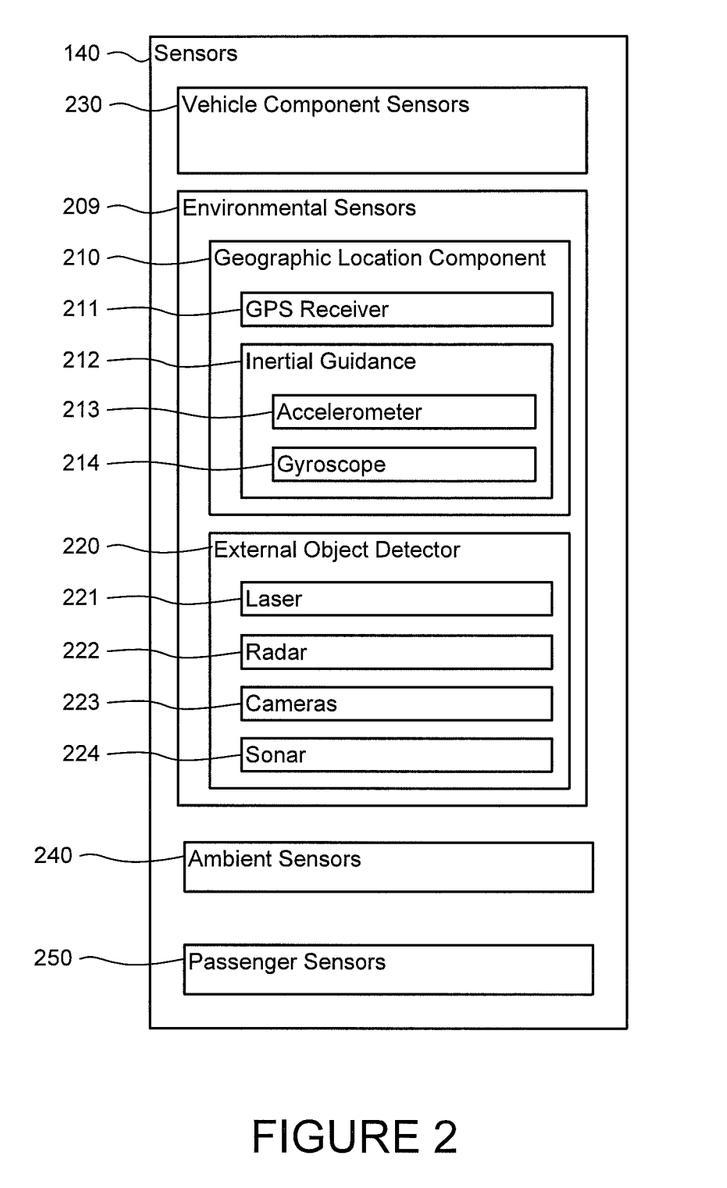
FIG. 2 is a functional diagram of sensors of a vehicle.

As shown in FIG. 2, the vehicle may also include a variety of internal and external sensors 140 that provide data to the autonomous vehicle computer system 130.

Figure 3:
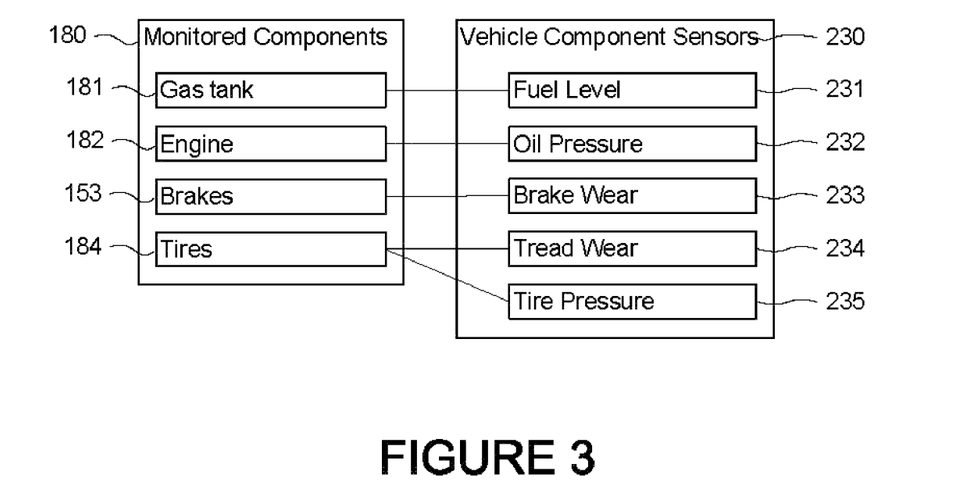
FIG. 3 is a functional diagram of monitored components and sensors of a vehicle.

Whereas environmental sensors 209 provide data about the environment surrounding the vehicle and passenger sensors 250 provide data about the passengers 195 in the vehicle, vehicle component sensors 230 provide information about the physical characteristics of the vehicle components. By way of example and as shown in FIG. 3, fuel level sensor 231 may monitor the amount of gasoline held by gas tank 181, oil pressure sensor 232 may monitor the amount of oil pressure in engine 182, brake wear sensor 233 may monitor the amount of wear on brakes 153, air pressure sensor 235 may monitor the amount of pressure in tires 184 and tread wear sensors 234 may monitor the treads of the tires. The vehicle may include other sensors as well, such as battery level, engine temperature, weight distribution and steering alignment sensors. In some aspects, the system and method may store and rely on information representing changes in the output of the sensors over time, i.e., a log of the fuel level at different times or an average fuel level over some selected time period.

A variety of the sensors may monitor components that are highly likely to become damaged based on the continued normal operation of the vehicle. For example, it may be expected that the brake pads will wear away and eventually require replacement. Data 134 may include detailed information regarding past vehicle maintenance repairs of such components (e.g., when brakes and tires were changed) as well as other components. In one aspect, sensors 230 detect changes in the physical characteristics of components that are within the car (e.g., under the hood) and likely to change as the vehicle is operated.

Environmental Sensors

Environmental sensors 140 allow the vehicle to understand and potentially respond to its environment in order to navigate and maximize safety for passengers as well as people or property in the surrounding environment. The sensors may be used to identify, track and predict the movement of objects as well, such as pedestrians and other vehicles. Yet further, the sensors may be used to provide recommendations. The vehicle may include other sensors that are not shown in FIG. 2.

Geographic Location Component

Geographic location component 210 is used to determine the geographic location and orientation of the vehicle 101. For example, component 210 may include a GPS receiver 211 to determine the vehicle's latitude, longitude and altitude. Although references herein to the location of the vehicle will often refer to a location in latitude/longitude/altitude coordinates, the data representing the location of the vehicle may also be relative to other reference systems, such as the vehicle's distance from objects. Some reference systems may be subject to less noise than others.

Inertial Guidance

The geographic location component may also include an inertial guidance system 212, which may in turn include an accelerometer 213 and gyroscope 214. The inertial guidance system 212 may determine the current orientation of the device and changes of speed in any direction. For example, the inertial guidance system 212 may detect when the vehicle is turning. It may also estimate the current location of the car relative to a starting location based on changes in speed and direction.

Multiple Sources

Other devices may also be used to determine the location of the vehicle 101. For example, if the external object detector 220 identifies an object and its location relative to the vehicle, and if processor 131 can access pre-existing data that identifies the geographic location of the object, then processor 131 can identify the geographic location of the vehicle. The system may also triangulate its location based on cell phone tower transmissions or the presence of smaller wireless networks. The processor may combine the information from the various components and detectors, or select the most accurate source, and determine the geographic location of the vehicle accordingly.

External Object Detector

The vehicle may include an external object detection system 220 for detecting objects external to the vehicle such as other vehicles, obstacles in the roadway, traffic signals, signs, trees, etc. The detection system 220 may include a laser 221, radar 222, cameras 223, sonar 224 or and other detection devices.

Laser

Vehicle 101 may include a laser 221 mounted on the roof or other convenient location. In one aspect, the laser may measure the distance between the vehicle and object surfaces facing the vehicle by spinning on its axis and changing its pitch. The laser may also be used to identify changes in surface texture or reflectivity. Thus, the laser may be configured to detect lane lines by distinguishing between the amount of light reflected by a painted lane line relative to unpainted dark pavement.

Radar

Sensors 140 may further include various radar detection units 222, such as those used for adaptive cruise control systems. The radar detection units may be located on the front and back of the car as well as on either side of the front bumper. In addition to using radar to determine the relative location of external objects, other types of radar may be used for other purposes as well, such as a conventional speed detector. Short wave radar may be used to determine the depth of snow on the road and to determine location and condition of the road surface.

Cameras

One of the sensors may also include one or more cameras 223. If multiple cameras are used and the distances from each other are known, the parallax from the different images may be used to compute the distance to various objects which are captured by the cameras. Content may also be extracted from images captured by a camera. For example, the vehicle may automatically slow down if its current speed is 50 mph and it detects, by using its cameras and using optical-character recognition, that it will shortly pass a sign indicating that the speed limit is 35 mph. Yet further, pattern matching and other feature detection algorithms may be used to determine the type of the object. This may be combined with other information to determine location specific information that is relevant to the maneuvering of the vehicle, such as determining the presence of a stop sign with cameras 223 and determining the location of the sign, and thus where the vehicle needs to stop, with laser 221.

Ambient State Sensors

Ambient sensors 240 may determine environmental aspects that do not specifically relate to external object detection, such as air quality sensors for detecting the surrounding air's temperature, humidity, or particulates.

User's State Sensors

Sensors 140 may also include sensors for determining the state of the user, such as the driver and other passengers in a car. For example, passenger sensors 250 may include a video camera that is used to determine whether the driver is asleep. Other sensors may determine the state of the interior of the car such as interior temperature, humidity, seat and mirror positions, weight measurements and distributions of the occupants (driver and passengers).

Although not shown in FIG. 2 or described herein, the system and method may include other types of sensors as well including but not limited to active and passive infrared sensors and radio frequency sensors.

Autonomous

The sensors may output their determinations to computer system 130. The system and method permits various data configurations between the computer system and the sensors. The sensors may provide the data in relatively raw low-level form or independently process the sensed information and provide relatively high-level data. Many of these sensors provide data that is processed by the computer in real-time, that is, the sensors may continuously update their output or provide updated output to the computer system 130 on demand. Thus, some of the sensors may instantaneously provide information that can be directly processed by the processor of the central control, such as a self-contained speed radar detector. Other sensors may require the processor to process data received from the sensor over a range of time, e.g., determining the speed of an object by comparing changes in its position based on the output of laser 221.

The components that control the movement of the vehicle may respond to instructions from computer system 130. For example, when engaged, computer system 130 may control some or all of components 150 so as to automatically steer, accelerate and decelerate a car. The data from the sensors permits the central control 130 to determine whether the vehicle's then-current direction or speed should be modified in response to the sensed environment. By way of example, if the vehicle is operating in a completely autonomous mode, computer system 130 may command the vehicle to accelerate (e.g., by increasing fuel or other energy provided to the engine), decelerate (e.g., by decreasing the fuel supplied to the engine or by applying brakes) and change direction (e.g., by turning the front two wheels). When provided with a destination, the computer may further select and navigate a route without further assistance of a person.

In that regard, computer system 130 may maneuver the car in response to information from the sensors, such as using the external object detector 220 to avoid hitting external objects and using the data provided by geographic location component 210 to avoid objects. For instance, if the computer determines that an object is obstructing the intended path of the vehicle, it may slow down and maneuver the vehicle around the obstruction.

The vehicle may also have various user input devices for activating or deactivating one or more autonomous driving modes. In some aspects, the driver may take control of the vehicle from the computer system by turning the steering wheel, pressing the accelerator or brakes, or otherwise operating a component that controls a function under the control of the processor.

User Input

Figure 4:
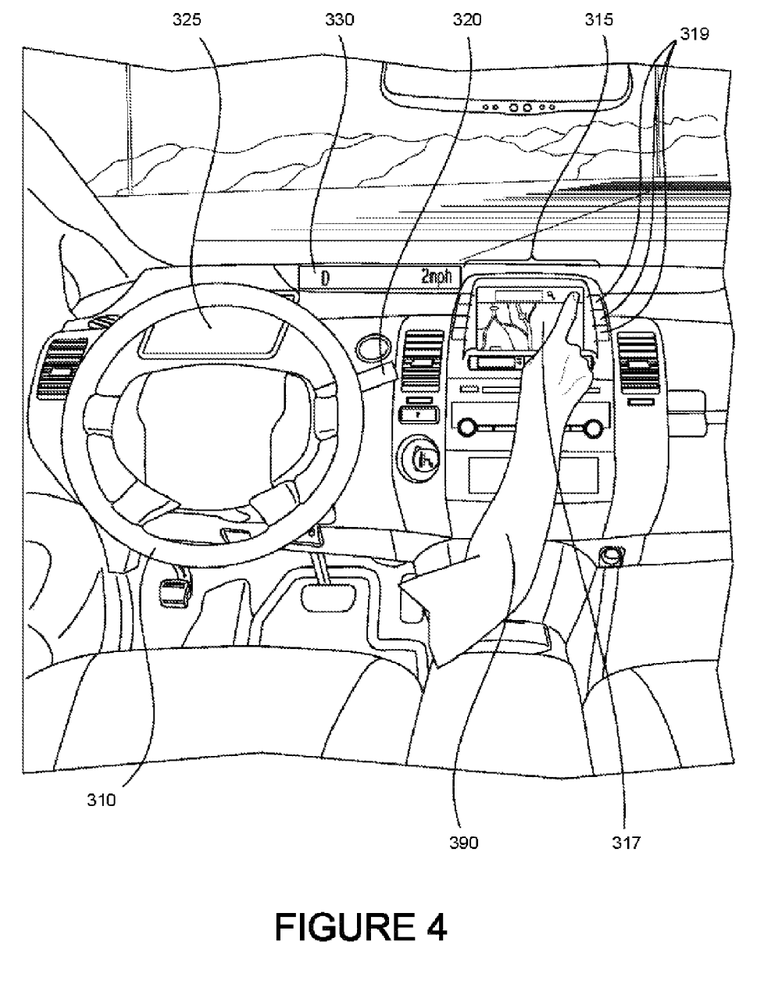
FIG. 4 is diagram of the interior of a vehicle.

FIG. 4 depicts an exemplary design of the interior of an autonomous vehicle. The autonomous vehicle may include all of the features of a non-autonomous vehicle, for example: a steering apparatus, such as steering wheel 310; a navigation display apparatus, such as navigation display 315; and a gear selector apparatus, such as gear shifter 320.

As shown in FIGS. 1 and 3, the vehicle may include one or more user input devices 160 that enable a user to provide information to the computer system 130. A user, such as passenger 390, may input a destination (e.g., 123 Oak Street) into the navigation system using touch screen 317 or button inputs 319. In another example, the computer system may extract the destination from a user's spoken command. User input devices 160 may also include other devices typically used with computer systems, including a keyboard, microphone, pointing device (e.g., trackball or mouse)

User Output

The vehicle may also include a variety of devices 170 for communicating information to a user. For instance, the interior of vehicle 101 may include an electronic display 325 (e.g., a monitor having a screen, a small LCD touch-screen or any other electrical device that is operable to display information). It may further include a status indicating apparatus, such as status bar 330, to indicate the current status of vehicle 101. In the example of FIG. 4, status bar 330 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, such indicators being readable by humans, other computers, or both.

Among other things, display 325 may display other information relating to the overall status of the vehicle, particular sensors or computer system 130. The display 325 may include computer generated images of the vehicle's surroundings including, for example, the status of the computer, the vehicle itself, roadways, intersections, as well as other objects and information. Computer system 130 may further use visual or audible cues to indicate whether the computer system is obtaining valid data from the various sensors, whether the computer is partially or completely controlling the direction or speed of the car or both, whether there are any errors, etc.

Method—Introduction

Figure 8:
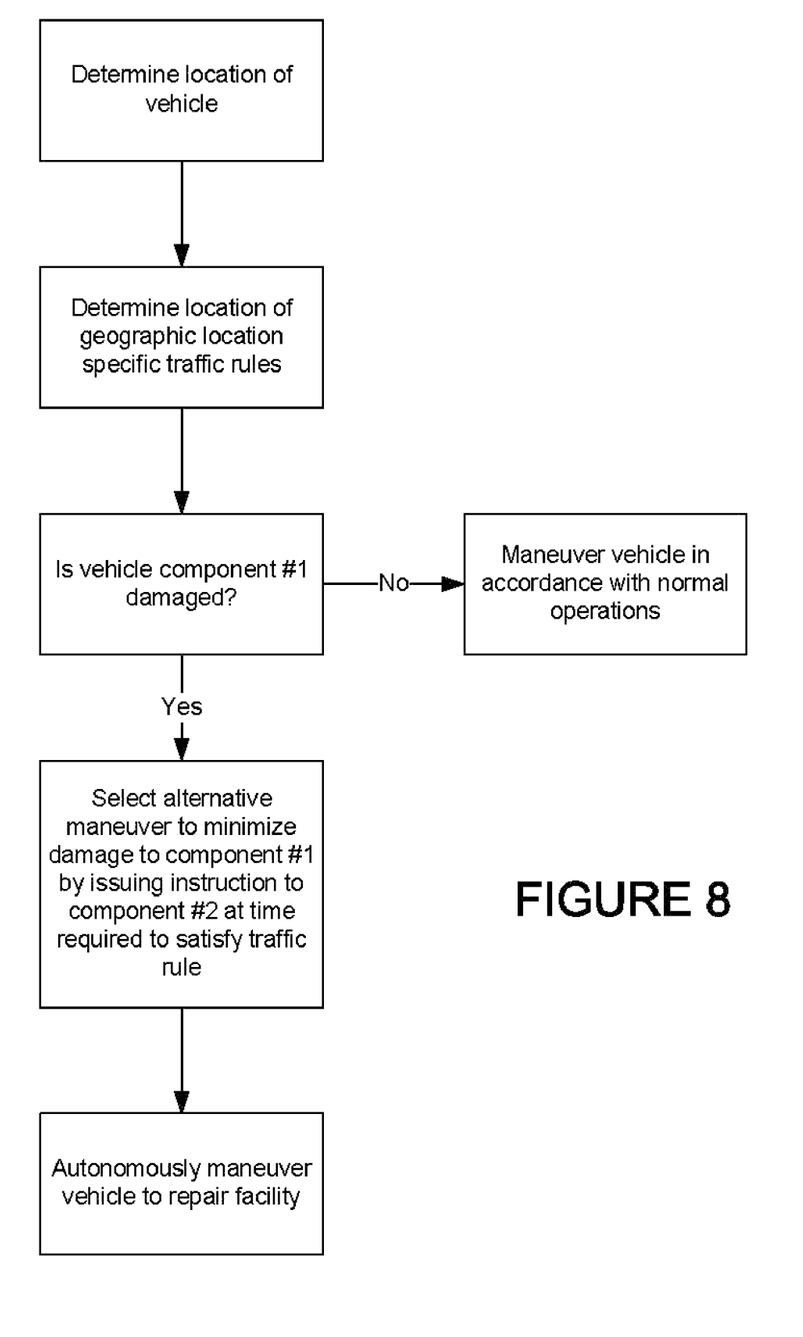
FIG. 8 is a flowchart.

In addition to the operations illustrated in FIG. 8, operations in accordance with system and method will now be described. Various operations can be handled in a different order or simultaneously, and each operation may be composed of other operations.

Maneuvering

The vehicle may continuously use the sensor data to identify objects, such as traffic signals, people, other vehicles, and other objects, in order to autonomously maneuver the vehicle to a destination and reduce the likelihood of a collision. Vehicle 101 may use the data to determine how to move the vehicle (e.g., slowing down based on turns or traffic jams detected by other vehicles, taking an alternative route, or taking an evasive action to avoid an object such as a deer). The vehicle may use the map data or other information to determine where traffic signals or other objects should appear and take actions, for example, by signally turns or changing lanes.

Mitigate Wear

Figure 5:
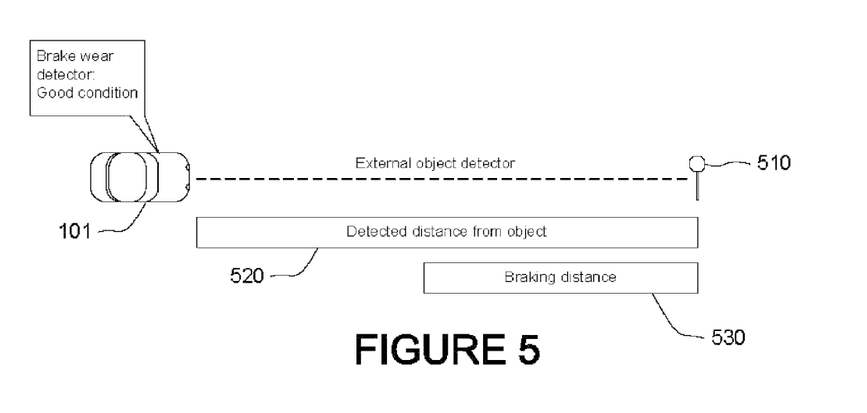
FIG. 5 is a diagram of vehicle movement in response to detection of a location-specific vehicle movement restriction.
Figure 6:
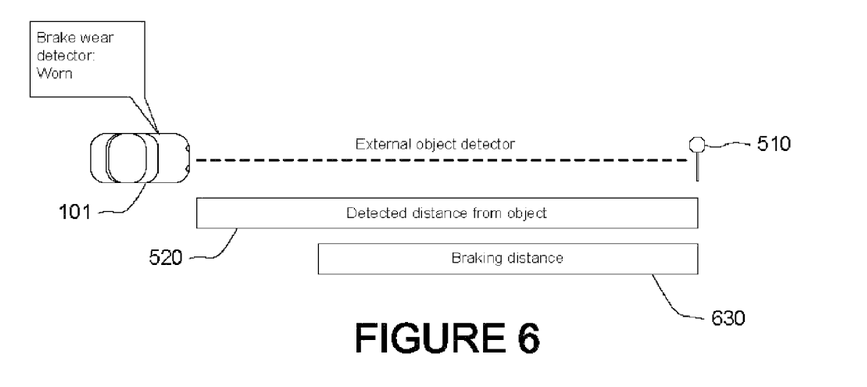
FIG. 6 is a diagram of vehicle movement in response to detection of a location-specific vehicle movement restriction.

The vehicle may use the vehicle component sensors 230 to detect wear and other types of damage and use the environmental sensors 209 to maneuver the vehicle 101 so as mitigate such damage. In the example of FIG. 5, vehicle 101 has detected the presence of, and its distance from, stop sign 510 with the use of external object detector 220. Yet further, the computer system 130 has checked brake wear detector 233 and determined that the brakes 153 are in good condition. Based on the foregoing, computer system 130 may determine that a comfortable braking distance is distance 530. FIG. 6 addresses the same scenario, but this time the computer system 130 has determined that the brakes 153 show evidence of excessive wear. As a result, in order to decrease the amount of wear that the brakes would normally experience, the computer system 130 may determine that it should decrease its typical rate of deceleration, e.g., it may determine to brake over a longer distance 630 and apply less pressure to the brakes. The vehicle thus changes speed at a slower rate when wear is detected than it would under normal conditions.

In that regard, the vehicle may compensate for damage to a vehicle component long after the damage has been detected. For instance, computer system 130 may have determined that the brakes were worn before the vehicle needed to brake and not change its driving behavior until it needed to brake again.

Yet further, the system and method may issue instructions to some vehicle components that are not of the same type as the damaged component. For example, the computer system 130 may determine based on map data 135 that it is about to descend a long hill with a stop sign at the bottom. If the brakes 153 are suffering from excessive wear, the computer system may instruct the throttle 152 to provide less gas to the engine than it would under normal circumstance in order to minimize the speed attained by vehicle 101 and thus minimize the amount that the vehicle must brake in order to come to a safe stop at the bottom of the hill. In that regard, the system and method may compensate for damage to one type of component by accessing location-specific traffic rule information and then changing the movement of the vehicle by issuing instructions to another type of component before the damaged component is engaged.

Figure 7:
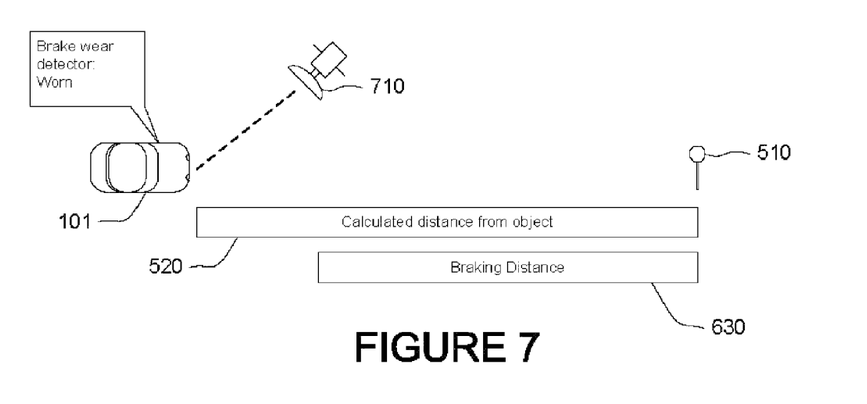
FIG. 7 is a diagram of vehicle movement in response to detection of a location-specific vehicle movement restriction.

In one aspect, the system and method also relies on map-related data in its process of determining maneuvers that will mitigate existing damage to a component. By way of example and as shown in FIG. 7, the vehicle may have determined its latitude/longitude position from GPS satellite 710 and, based on the latitude/longitude location of stop signs stored in map data 135, calculated the distance 520 to the stop sign 510 and applied less brake pressure over a longer brake distance 630 than it would have if the brakes were not worn. The processor may thus determine the geographic location of the vehicle, the geographic location of requirements that apply to vehicles, and maneuver the vehicle based on such information so as to mitigate damage to the relevant component.

In addition to changing the way the vehicle brake, the vehicle may change the way it maneuvers in other ways as well, such as accelerating differently or changing directions. For instance, the vehicle may accelerate more slowly if the measured oil pressure is excessively high. The vehicle may also turn more or less tightly in order to mitigate wear.

The vehicle may further issue a warning or repair recommendation to the user regarding the vehicle's change in driving behavior and the problem with the component. For example, the recommendation may be shown on display 325 shown in FIG. 3.

Indirect Damage Detection

The vehicle may also use other systems and methods to determine the state of a vehicle component. For example, the vehicle may monitor how far it takes the car to stop compared to expected braking distance. If the distance is longer than expected, such as taking longer than it has in the past, the computer system may determine that the brakes are worn and start braking earlier. The system and method may also estimate the state of a component based on its repair service record. In that regard, the processor may query data 134 or an external database (e.g., a server with which the vehicle is in wireless communication) for repair records and estimate the wear on a component based on the length of time since the last repair.

Other Factors Affecting Maneuvering

The system and method may rely on other information to change the way the vehicle is maneuvered. For instance, the vehicle may sense weight distribution and adjust maneuvering in response to the changes in the loading and/or weight distributions on the vehicle. The vehicle may further move differently when there is only one user in the vehicle than four passengers on board, or differently with light loads than with hauling a trailer behind. The vehicle may also adapt the driving to the observed environmental changes such as weather or roadway conditions.

Modeling of the patterns of changes in the vehicle's performance and conditions, as well as modeling of the patterns of changes in the driving environment, may be performed by the autonomous driving computer system 130. Alternatively, predetermined models may be stored in the autonomous driving system. The computer system 130 may process the observed data, fit them into the models, and issue compensation signals accordingly.

Self-Repair

Yet further, the autonomous vehicle may take the steps necessary to repair a component. By way of example, when the vehicle 101 is not being used by anyone, the vehicle 101 may autonomously and without direct human assistance navigate to a repair facility, notify the facility of the component that requires repair and return to its original location when the repair is finished.

Not Limited to Examples

It will be further understood that the sample values, types and configurations of data described and shown in the figures are for the purposes of illustration only. In that regard, systems and methods in accordance with aspects of the invention may include various types of sensors, communication devices, user interfaces, vehicle control systems, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the systems and methods as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects. Unless expressly stated to the contrary, every feature in a given embodiment, alternative or example may be used in any other embodiment, alternative or example herein.

The invention claimed is:

1. A method of maneuvering a vehicle comprising:
    detecting a characteristic of an environment surrounding the vehicle;
    monitoring an actual braking distance of the vehicle;
    comparing, with a processor, the actual braking distance to an expected braking distance to determine an amount of brake wear of the vehicle, wherein increases in the amount of brake wear are affected by different maneuvers; and
    selecting, with the processor, between a first maneuver and a second maneuver based on the detected characteristic of the environment and the detected amount of brake wear, the second maneuver including an application of brake pressure at a level lesser than that of the first maneuver; and
    moving the vehicle in accordance with the selected maneuver,
    wherein the first maneuver is selected when there is a first amount of brake wear and the second maneuver is selected when a second amount of brake wear is detected, the second amount being greater than the first amount.

2. The method of claim 1 wherein the second maneuver includes employing a brake distance longer than a brake distance of the first maneuver.

3. The method of claim 1 wherein detecting a characteristic of the environment comprises detecting an object external to the vehicle and maneuvering in response to the object.

4. The method of claim 3 wherein the object is a stop sign.

5. The method of claim 1 wherein detecting a characteristic of the environment comprises determining a traffic requirement.

6. The method of claim 1 wherein the vehicle is moved autonomously in accordance with the selected maneuver in response to instructions from the processor.

7. The method of claim 1, wherein the processor determines the amount of brake wear when the actual braking distance is longer than the expected braking distance.

8. The method of claim 1 further comprising moving the vehicle autonomously to a repair facility after the performance of the maneuver.

9. A method of controlling a vehicle comprising:
    determining an amount of damage to a first component of the vehicle;
    determining a geographic position of the vehicle; and
    compensating, with a processor, for the amount of damage to the first component by:

accessing location-specific traffic rule information based on the geographic position of the vehicle; and changing movement of the vehicle, based on the geographic position and the location-specific traffic rule information, by issuing an instruction to a second component before the first component is engaged.

10. The method of claim 9, wherein the geographic position of the vehicle is determined based on traffic requirements at geographic locations and detecting the position of the vehicle.

11. The method of claim 9, wherein the damage to the first component of the vehicle comprises brake wear.

12. The method of claim 9, wherein the first component is a brake, and the second component is a throttle.

13. The method of claim 12, wherein to compensate for damage to the brake, the processor issues the instruction to the throttle before the brake is engaged, and wherein the instruction includes a provision of energy to an engine of the vehicle at a lesser amount than if the amount of damage to the brake does not exceed a threshold.

14. The method of claim 13, wherein the threshold is associated with excessive wear of the brake.

15. A method of controlling a vehicle comprising:
determining wear on a component of the vehicle;
determining a geographic position of the vehicle;
determining traffic requirements in a path of the vehicle;
selecting, with a processor, between a first and second maneuver based on the determined wear and the determined geographic position, wherein at least one difference between the first and second maneuver is selected from the group consisting of rate of acceleration, rate of deceleration and direction;
moving the vehicle in accordance with the selected maneuver; and
after moving the vehicle in accordance with the selected maneuver, determining whether passengers are present in the vehicle, and moving the vehicle to a repair facility under the control of the processor when passengers are not present in the vehicle.

16. A system of controlling a movement of a vehicle comprising:
a processor;
a memory accessible by the processor; and
instructions contained in the memory and executable by the processor,
wherein the instructions comprise:
determining a geographic location of the vehicle relative to a location-dependent vehicle movement restriction,
determining whether a first component of the vehicle is damaged,
providing a first instruction to a second component of the vehicle to move the vehicle so as to comply with the location-dependent movement restriction when the first component is determined to be not damaged, and
providing a second instruction to the second component to move the vehicle so as to comply with the location-dependent movement restriction when the first component is determined to be damaged, wherein the movement instructed by the second instruction is different than the movement instructed by the first instruction, and wherein the second instruction includes a provision of energy to an engine of the vehicle at a lesser amount than that of the first instruction.

17. The system of claim 16, wherein the second component is a throttle.

* * * * *